United States Patent [19]

Tacussel

[11] 4,079,375
[45] Mar. 14, 1978

[54] RADAR, IN PARTICULAR FOR WATCHING OVER PREMISES

[76] Inventor: Maurice Marcel Tacussel, 105bis, rue du Point du Jour 92100, Boulogne-Billancourt, France

[21] Appl. No.: 698,677

[22] Filed: Jun. 22, 1976

[30] Foreign Application Priority Data

Jun. 23, 1975 France .................. 75 19539

[51] Int. Cl.² ............ G01D 21/04; G01S 7/34; G01S 9/42; G08B 13/22
[52] U.S. Cl. ............ 343/5 PD; 340/258 A
[58] Field of Search .............. 343/5 PD; 340/258 A

[56] References Cited

U.S. PATENT DOCUMENTS

| 3,134,100 | 5/1964 | Lakatos | 340/258 A X |
| 3,331,065 | 7/1967 | McDonald | 343/5 PD |
| 3,634,884 | 1/1972 | Ross | 340/258 A |
| 3,882,493 | 5/1975 | Bolger | 340/258 A X |
| 3,987,427 | 10/1976 | Clift | 343/5 PD X |
| 4,010,459 | 3/1977 | Pontoppidan et al. | 340/258 A |

FOREIGN PATENT DOCUMENTS 1,319,005  5/1973  United Kingdom .......... 343/5 PD

Primary Examiner—Malcolm F. Hubler

[57] ABSTRACT

A homodyne type radar for detecting intrusions into its field of radiation using the Doppler effect, working by pulses connected to an alarm device triggered in case of an intrusion. The output circuit of the pulse generator of the radar apparatus comprises a capacitor connected at the pulse frequency to a pulse generating and receiving circuit, the load variation of this capacitor controlling the alarm.

The resistor is series connected to the emitter-collector circuit of a hyperfrequency transistor which is common to the pulse generating and receiving circuit.

The cicuit connecting the capacitor to the alarm device comprises a low-pass filter and a step-apparatus.

An oscillator controlling the pulse generating apparatus is also used to control a direct voltage to direct voltage converter when the power is supplied by a battery.

10 Claims, 5 Drawing Figures

RADAR, IN PARTICULAR FOR WATCHING OVER PREMISES

Watching over premises with radars involves complex problems which have not yet been completely solved.

Such radar devices normally use the Doppler effect induced by the displacement of an intruder into the premises under supervision by the radar. The displacement speed of the intruder is relatively small and the frequency variation induced by the Doppler effect, which is small, is difficult to exploit. Up to now such devices have used a continuous mode of operation, i.e. they continuously send out radiations when they are in operation. This results in a relatively high energy consumption. When, as desirable, such devices are self-sufficient, i.e. when each of them has its own power source, usually a battery, their effective autonomy is limited to a few thousand hours, which in certain cases might be insufficient.

The present invention is based on the idea that a radar apparatus working as an alarm device to detect an intrusion will have a much longer autonomy when working by pulses, the energy outlay being in fact null outside the duration of the pulses. Although radar devices functioning by pulses are known, their use in watching over premises has not up to now been possible. the distance separating the apparatus from the intruder is in the order of a meter or at most, a few tens of meters, and hence the reflected pulse is almost simultaneous with the emitted pulse and is difficult to distinguish from the later one. The difficulty is even greater when, in order to simplify the manufacture and hence to increase the economy realized, one wishes to have a homodyne type radar, i.e. a radar apparatus which comprises common components for the emitter section and for the receiver section. The homodyne receiver is then "dazzled" by the pulses which are emitted and is not able to provide meaningful information from the received echoes.

The invention solves difficulties. An object of the invention is to provide a homodyne type radar apparatus which works by pulses and nevertheless provides an alarm in case of intrusion. A further object is to provide such a radar apparatus which is as reliable and secure as radar devices using a continuous mode of operation.

The apparatus of the invention has a much greater autonomy: it remains operative, all things otherwise being equal, during an interval of time fifteen to twenty times greater then that of radar devices working in a continuous mode.

The apparatus of the invention is characterized by the fact that the output circuit of the electronic component which generates the pulses and in which the pulses are also received, comprises a resistor, the voltage across this resistor being used to charge a capacitor at the pulse frequency, the variation of the charge on the capacitor being used to detect the Doppler effect introduced by the displacement of an intruder in the field covered by the radar radiations.

The following detailed description will best be understood in conjunction with the accompanying drawings, in which.

Figure 4A:
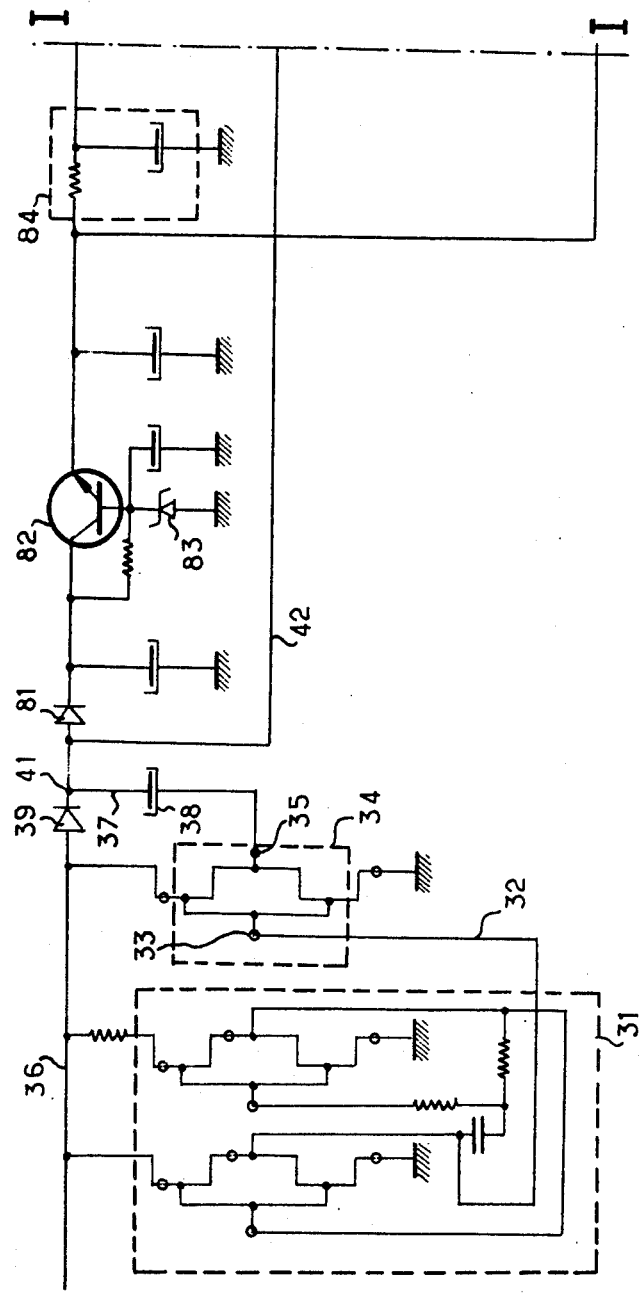
Figure 4B:
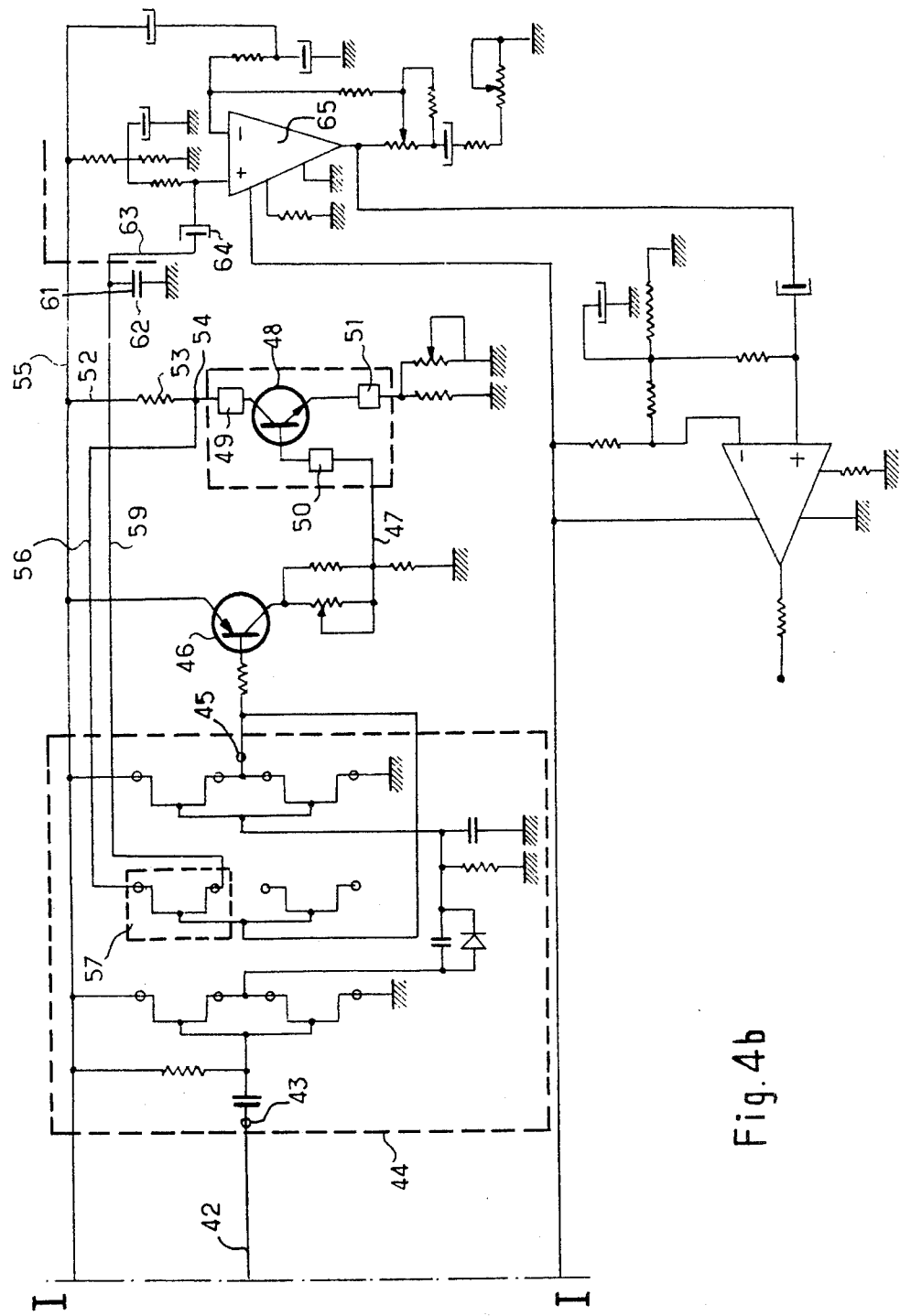

FIG. 4 comprising two parts 4a and 4b separated by the line I—I is a more detailed schematic representation of an embodiment of the present invention.

Figure 1:
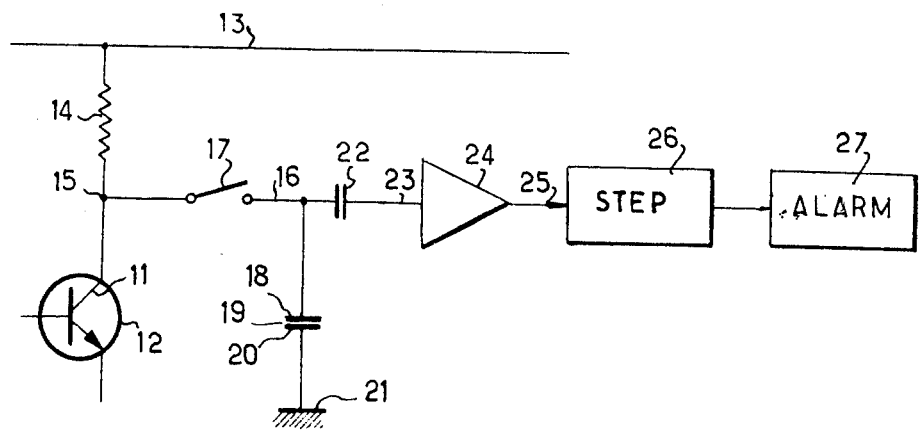
FIG. 1 is a schematic representation of an embodiment of the present invention.

There is shown in FIG. 1 the collector 11 of an output transistor 12 which is part of a hyperfrequency apparatus constituting a pulse generator and receiver of a homodyne type radar. The collector 11 is connected to the power supply line 13 by way of a resistor 14. Terminal 15 of the resistor 14 is connected to the first end of an electronic switch 17. The second terminal of the electronic switch 17 is connected via a conductor 16 to terminal 18 of a capacitor 19. The other terminal 20 of the capacitor 19 is connected to the earth 21.

Switch 17 is closed during a small time interval at the frequency of the emitted radar pulse. Terminal 18 is linked by a linkage capacitor 22 to the input 23 of an amplifier 24 which also serves as a low-pass filter. The output 25 of amplifier 24 is linked by a step-apparatus 26 to an alarm device 27, for example a siren. The operation of the apparatus of FIG. 1 will now be explained with reference to FIG. 2.

When no object is displaced in the radiation field created by the radar apparatus, the echo pulses have a constant amplitude and are produced at the frequency of the emitted pulses and hence their influence on the potential of point 15 remains constant. Each time the electronic switch 17 is closed, terminal 18 is connected to a point which has a constant potential, and hence the charge of capacitor 19 remains constant. No signal is available at the output 25 of amplifier 24.

Figure 2:
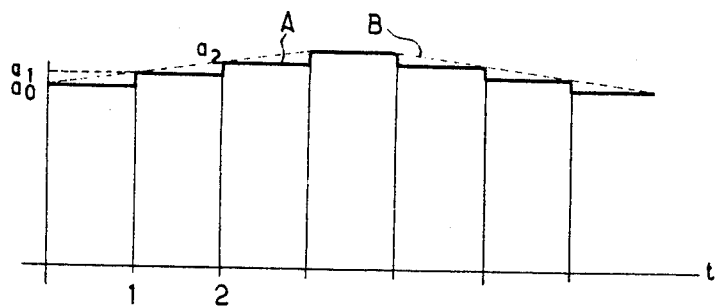
FIG. 2 is a diagram used for explaining the operation of the circuit in FIG. 1.

However, if an object is displaced in the radiation field of the radar, the Doppler effect introduced by this displacement induces a variation of the received pulse. If, for example as shown in FIG. 2, before the instrusion of the voltage at point 15 when switch 17 is being closed has the value $a_0$, after the intrusion and at a succeeding pulse this voltage has, corresponding to point 1 of the abscissa axis of FIG. 2, a value which is greater. Hence the charge on capacitor 19 increases from the value $a_0$ to the value $a_1$. At the next pulse, when the switch is closed at time 2, the charge of said capacitor 19 quickly takes the value $a_2$. The step line A represents the voltage applied to the input 23 of amplifier 24.

At the output 25 of the amplifier can be found a voltage illustrated by the line B which has the shape of a sine-wave, whose frequency is precisely the Doppler frequency. The amplitude of this voltage waveform is a function of the distance of the object in motion with respect to the radar apparatus, and is also a function of its reflection surface in the radiation field.

The step apparatus 26 provides a protection against the voltage irregularities specific to the apparatus. The triggering of siren or alarm 27 is effectively restricted to instrusions for which an alarm must be given.

The energy consumption of the apparatus is very much reduced compared to that of a radar apparatus working in a continuous mode, the emission time of the former representing but a relatively small fraction of the utilization time. Nevertheless, the security provided by the apparatus is as good as the security provided by an apparatus working in a continuous mode, for the interval of time during which an intrusion takes place is always much larger than the interval of time during which several successive pulses are emitted.

The alarm radar of the present invention is also characterized by the fact that an oscillator which comprises a multivibrator to control with the help of a monostable the pulses emitted in hyperfrequency, is also used to control a direct voltage to direct voltage converter, for example a voltage doubler. The batteries provided for the power supply of the radar therefor can be used at their full capacity in spite of the voltage drop which occurs during the life of the batteries, the voltage which is doubled being then regulated at the most convenient value for the power supply of the radar apparatus.

Furthermore, the voltage doubler creates voltages having the frequency of the oscillator, and hence its connection to a monostable circuit or to an apparatus of the same type controlling the hyperfrequency apparatus naturally induces the triggering of the radar pulses at the oscillator frequency. Hence the pulsations which could take place between the frequency of the oscillator of the voltage converter and the frequency of the radar pulse modulator in the case where this last element is under the control of an independent oscillator are avoided.

Figure 3:
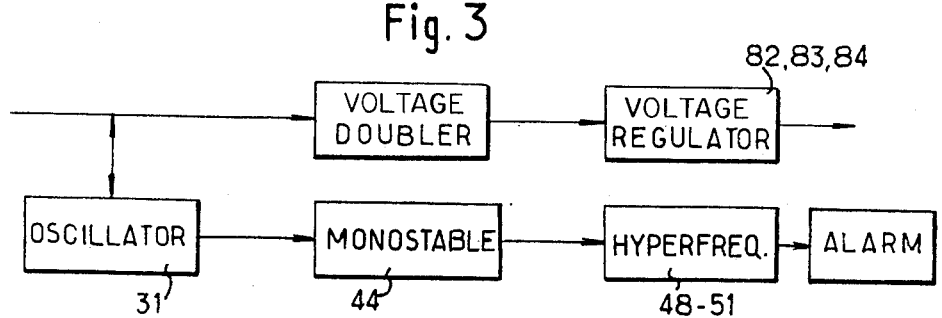
FIG. 3 is a block-diagram of an embodiment of the present invention.

With reference to FIGS. 3 and 4, oscillator 31 constructed in known fashion with CMOS circuits, is connected by a conductor 32 to the input 33 of a switch 34 whose output 35 is connected to the power supply line 36 coming from a battery or from any other power supply by a circuit 37 comprising a capacitor 38 and a diode 39. In a first of two possible states switch 34, capacitor 38 is loaded through diode 39. In the other state of switch 34, capacitor 38 cannot be discharged through diode 39 and hence a voltage is created at point 41 which has the shape of a square wave and which takes successively the value of the supply voltage, thereafter assuming a value which is approximately double that of said supply voltage (addition of the voltage furnished by capacitor 38), and thereafter the value of the supply voltage, this sequence occurring at the frequency of oscillator 31. Voltage created at point 41 is applied through conductor 42 to the input 43 of a monostable apparatus 44 in order to control this last apparatus. Pulses of constant width at the frequency of oscillator 31 are supplied at the output 45 of the monostable 44.

They are amplified in a transistor 46 from which they are transmitted by conductor 47 to transistor 48 which is part of the hyperfrequency stage comprising the usual hyperfrequency circuits 49, 50, 51. In circuit 52 of the collector of transistor 48 is placed a resistor 53 having a terminal 54 connected by a conductor 56 to a switch 57 and a second terminal connected to power supply line 55. Switch 57 is part of the monostable oscillator 44, and is closed at the frequency of oscillator 31. When switch 57 is closed, a conductor 59 transfers the voltage available at the terminal 54 of resistor 53 to terminal 61 of a capacitor 62. A conductor 63 links the capacitor 62 to an amplifier 65 through a coupling capacitor 64. Amplifier 65 is followed by a low-pass filter and by a step-apparatus linked to the alarm, for example a siren.

The power supply of the monostable and of the other components is obtained from the voltage available at point 41 through the action of a rectification diode 81 and of a regulator comprising a transistor 82 and a Zener diode 83, which sets the reference voltage of transistor 82, which is connected as an emitter-follower. The power supply apparatus comprises several filters, one of which is shown as circuit 84.

What I claim is:
1. A homodyne radar apparatus for detecting instrusions into its radiation field by means of the Doppler effect, comprising:
   homodyne radar means for generating radar pulses and for receiving echoes of said radar pulses, said homodyne radar means including means for generating a signal which varies in amplitude when an object is displaced within its radiation field and having an output circuit comprising an impedance having a first terminal to which is applied a supply voltage and a second terminal connected to said means for generating a signal which varies in amplitude where an object is displaced within the radiation field of the homodyne radar means;
   switch means having input and output terminals with said input terminal being connected to said second terminal for receiving said signal which varies in amplitude and providing said signal to said output terminal thereof at the frequency of said generated radar pulses;
   capacitor means connected to said output terminal of said switch means for receiving said signal which varies in amplitude so that the voltage across said capacitor means varies as said signal which varies in amplitude; and
   alarm means responsive to variations in the voltage across said capacitor means for generating an alarm signal when an intrusion occurs.

2. A radar apparatus according to claim 1, in which said impedance comprises a resistor, and said output circuit further comprises a transistor having its collector-emitter circuit connected in a series circuit with said resistor, said series circuit having a supply voltage applied thereacross.

3. A radar apparatus according to claim 2, in which the collector of said transistor is connected to said second terminal.

4. A radar apparatus according to claim 1, further comprising a low pass filter connected between said capacitor means and said alarm means.

5. A radar apparatus according to claim 1, further comprising a step means having an input terminal for receiving a signal which varies as said voltage across said capacitor and an output terminal for providing an alarm triggering signal only at such times that intrusions occur in the radiation field of said radar apparatus, said alarm triggering signal being supplied to said alarm means for controlling said alarm signal.

6. A radar apparatus according to claim 1, further comprising an oscillator energized by a supply voltage for generating a control frequency voltage for controlling the frequency of said generated radar impulses, and a direct voltage to direct voltage converter connected to said oscillator for receiving said control frequency voltage and providing a voltage converted direct voltage for energizing said radar apparatus.

7. A radar apparatus according to claim 6, in which said oscillator comprises a multivibrator.

8. A radar apparatus according to claim 6, in which said voltage converter comprises a voltage doubler for providing an output voltage of twice the amplitude of said supply voltage and having the same frequency as said control frequency voltage, and voltage regulator means for receiving said output voltage of said voltage doubler and providing a voltage of regulated amplitude as said voltage converted direct voltage.

9. A radar apparatus according to claim 8, further comprising a monostable connected to said voltage doubler for receiving said output voltage of said voltage doubler and providing pulses of constant width at said frequency of said control frequency voltage, said pulses of constant width being provided to said homodyne radar means for controlling said radar impulses.

10. A radar according to claim 9 wherein said monostable includes interruptor means for controlling the load of the capacitor.

* * * * *